United States Patent
Al-Naffouri et al.

(10) Patent No.: US 8,223,862 B2
(45) Date of Patent: Jul. 17, 2012

(54) OFDM INTER-CARRIER INTERFERENCE CANCELLATION METHOD

(75) Inventors: Tareq Yousuf Al-Naffouri, Dhahran (SA); Naofal Al-Dhahir, Plano, TX (US); Muhammad Saqib Sohail, Dhahran (SA)

(73) Assignees: King Fahd University of Petroleum and Minerals, Dhahran (SA); King Abdulaziz City for Science and Technology, Riyadh (SA)

( * ) Notice: Subject to any disclaimer, the term of this patent is extended or adjusted under 35 U.S.C. 154(b) by 469 days.

(21) Appl. No.: 12/588,585

(22) Filed: Oct. 20, 2009

(65) Prior Publication Data

US 2011/0090975 A1    Apr. 21, 2011

(51) Int. Cl.
*H04K 1/10* (2006.01)
*H04L 27/28* (2006.01)

(52) U.S. Cl. ......... 375/260; 375/285; 375/316; 375/348

(58) Field of Classification Search .................. 375/260, 375/285, 316, 348
See application file for complete search history.

(56) References Cited

U.S. PATENT DOCUMENTS

| | | | | |
|---|---|---|---|---|
| 7,248,648 B2 * | 7/2007 | Erving et al. | ................. | 375/316 |
| 7,433,419 B2 | 10/2008 | Yun et al. | | |
| 7,907,689 B2 * | 3/2011 | Walton et al. | ................. | 375/347 |
| 2004/0082303 A1 * | 4/2004 | Giannakis et al. | ............ | 455/130 |
| 2005/0147176 A1 | 7/2005 | Yun et al. | | |
| 2005/0265467 A1 | 12/2005 | Dabak et al. | | |
| 2006/0159196 A1 | 7/2006 | Kwun et al. | | |
| 2006/0239367 A1 | 10/2006 | Wilhelmsson et al. | | |
| 2007/0248151 A1 | 10/2007 | Kim et al. | | |
| 2007/0297522 A1 | 12/2007 | Baggen et al. | | |
| 2008/0008261 A1 | 1/2008 | Baggen et al. | | |
| 2008/0144749 A1 | 6/2008 | Wilhelmsson et al. | | |
| 2008/0219371 A1 | 9/2008 | Hong et al. | | |

FOREIGN PATENT DOCUMENTS

| | | |
|---|---|---|
| CA | 2627057 A1 | 9/2008 |
| CN | 1801792 A | 7/2006 |
| CN | 101056302 A | 10/2007 |
| CN | 101355546 A | 1/2009 |
| EP | 1748612 A1 | 1/2007 |
| WO | WO2004006525 A1 | 1/2004 |
| WO | WO2007111825 A2 | 10/2007 |
| WO | WO2009002774 A1 | 12/2008 |

OTHER PUBLICATIONS

ICI Mitigation for Pilot-Aided OFDM Mobile Systems, IEEE Transactions on Wireless Communications, vol. 4. No. 2 Mar. 2005 Mostofi, et al.

* cited by examiner

*Primary Examiner* — Ted Wang
(74) *Attorney, Agent, or Firm* — Richard C. Litman

(57) ABSTRACT

The OFDM channel estimation and Inter-Carrier Interference (ICI) cancellation method uses a few pilots within Orthogonal Frequency Division Multiplexing (OFDM) systems in general, and mobile OFDM systems in particular. The frequency domain channel is estimated using an eigenvalue based model reduction technique with high accuracy. A Minimum Mean Square Error (MMSE) based Finite Impulse Response (FIR) equalizer is then used to obtain an ICI free estimate of the transmitted signal.

20 Claims, 8 Drawing Sheets

OFDM INTER-CARRIER INTERFERENCE CANCELLATION METHOD

BACKGROUND OF THE INVENTION

1. Field of the Invention

The present invention relates to Orthogonal Frequency Division Multiplexing (OFDM) modulation methods, and more specifically to an OFDM channel estimation and inter-carrier interference cancellation method.

2. Description of the Related Art

The OFDM signal includes a number of independently modulated, mutually orthogonal subcarriers over which large constellation signals can be transmitted, allowing very effective use of the spectrum with high bandwidth efficiency. High data rate broadband transmissions suffer inescapably from frequency selectivity, which causes Inter Symbol Interference (ISI). A Cyclic Prefix (CP) of length greater than or equal to the channel length is appended to the OFDM symbol to absorb the ISI, but at the expense of a rate loss. The CP thus serves to decouple the OFDM symbols, resulting in a simplified, single-tap equalizer structure at the receiver. The ability of OFDM to allow high-speed data transmission over frequency selective channels with simple equalizers has led to its adoption for many conventional broadband standards, including Digital Audio and Video Broadcasting (DAB, DVB), wireless local area network (WLAN) standards (e.g., IEEE 802.11a/b/g and HIPERLAN/2) and high-speed transmission over digital subscriber line (DSL). A number of emerging broadband wireless communication standards are using or planning to use OFDM modulation, including 802.16 (WiMAX), 802.20 Mobile Wireless Broadband Access (MWBA) and other emerging cellular wireless communication systems, such as 3GPP evolution and 4G.

The orthogonality of the subcarriers of the OFDM system is of critical importance. If this orthogonality is lost, the information on one subcarrier is leaked to other adjacent subcarriers, i.e., the subcarriers are no longer decoupled. This leakage is termed as inter-carrier interference (ICI). There are three main contributing factors to ICI, namely, phase noise, frequency error, and Doppler shift. In practice, the effect of phase noise and frequency error can be minimized by proper receiver design, and thus these two factors do not amount for a large ICI component. Doppler shift appears due to the relative motion of the transmitter and receiver and is the main cause of ICI, especially in mobile wireless environments where the channel is continuously changing with time. Under such conditions, maintaining the orthogonality of OFDM subcarriers is a challenge, particularly if the time variation is large.

The interaction of the subcarriers due to ICI complicates the data detection process at the receiver, as detection can no longer be performed on a carrier-by-carrier basis. Rather, some form of equalization must be employed. The degree of time variation of the channel is directly related to the magnitude of ICI. For example, Doppler shift is an issue for the DVB-H system, which targets highly mobile users. The problem is more severe for DVB-H systems in the United States, as compared to those planned for the rest of the world. This is because, in the United States, the carrier frequency for DVB-H is between 1.67-1.675 GHz, which is roughly twice the highest frequency being considered elsewhere, meaning that the Doppler shift will be higher for the U.S. system. Also, the bandwidth of the U.S. system is 5 MHz, as opposed to the 8 MHz bandwidth of the rest of the world, so that the frequency spacing for the U.S. system will be reduced by a factor of ⅝.

In the absence of ICI (as long as the channel remains constant within one OFDM symbol), to obtain the estimate of the channel matrix H, one needs to estimate N parameters (i.e., only the diagonal of the N×N channel matrix H). On the other hand, for severe time variation, one needs to estimate all the $N^2$ parameters (i.e., every element of H). For mild time variation, it would be sufficient to assume H to have M diagonals and estimate only MN parameters. Faster time variation requires frequent updates of channel estimate. This burdens the receiver, as the channel gains have to be periodically estimated before equalization can be performed.

A solution to the high frequency of channel estimation and the large number of parameters that need to be estimated is to send a large amount of training data, but this reduces the useful data throughput of the system. By making proper use of the a priori available information (data and channel constraints) about the system, we can reduce this training overhead. Another solution is to use Iterative methods for ICI cancellation, but these not only suffer from inherent latency, but also prove to be computationally costly.

Thus, an OFDM inter-carrier interference cancellation method solving the aforementioned problems is desired.

SUMMARY OF THE INVENTION

The OFDM channel estimation and inter-carrier interference cancellation method uses a few pilots within Orthogonal Frequency Division Multiplexing (OFDM) systems in general, and mobile OFDM systems in particular. The frequency domain channel is estimated using an eigenvalue-based model reduction technique with high accuracy. A Minimum Mean Square Error-based (MMSE) Finite Impulse Response (FIR) equalizer is then used to obtain an ICI free estimate of the transmitted signal.

A method is provided for ICI cancellation in OFDM systems in a high-Doppler environment, the received signal comprising a plurality of subcarriers. Furthermore, the ICI cancellation method, in the frequency domain, at least partially removes the overlap between M adjacent interfering subcarriers. The ICI cancellation method is fast and computationally efficient.

The method includes a receiver structure for efficiently canceling ICI using an MMSE-based FIR equalization filter. The taps of the filter are updated based on the estimate of the channel taps by the channel estimation logic.

An ICI cancellation method is provided for use in an OFDM communication system experiencing high Doppler, in which the receiver estimates the channel from the pilots inserted in the OFDM symbol at the transmitter. The method at the transmitter includes processing and precoding the data, arranging the data and pilots on the respective subcarriers, modulating it to an OFDM symbol, inserting the CP, and transmitting the OFDM symbol over the channel. The method steps at the receiver include receiving the transmitted OFDM symbol, removing the CP, demodulating the OFDM symbol, detecting the pilots, using the pilots to estimate the channel, and detecting the transmitted data from the received signal using the channel estimate.

The ICI cancellation method calculates the estimate of the ICI term from the estimate of the Doppler frequency shift of the received signal and uses it to mitigate the effect of ICI on the received signal.

Moreover, the ICI cancellation method is based on an arrangement of pilot subcarriers of the OFDM symbol such that the receiver is able to detect the pilot subcarriers independent of data subcarriers.

The channel is estimated based on pilot subcarriers, which at least minimizes the effect of ICI. Furthermore, the method makes a collective use of the various constraints on the communication system, providing the ICI free signal in a single iteration and, thus, performs faster than iterative ICI cancellation methods.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The OFDM channel estimation and Inter-Carrier Interference (ICI) cancellation method uses a few pilots within Orthogonal Frequency Division Multiplexing (OFDM) systems in general, and mobile OFDM systems in particular. The frequency domain channel is estimated using an eigenvalue based model reduction technique with high accuracy. A Minimum Mean Square Error (MMSE) based Finite Impulse Response (FIR) equalizer is then used to obtain an ICI free estimate of the transmitted signal.

At the outset, it should be understood that the various actions could be performed by program instruction running on one or more processors, by specialized circuitry or by a combination of both. Moreover, the method can additionally be considered to be embodied, entirely or partially, within any form of computer readable carrier containing instructions that will cause the executing device to carry out the technique disclosed herein.

Figure 1:
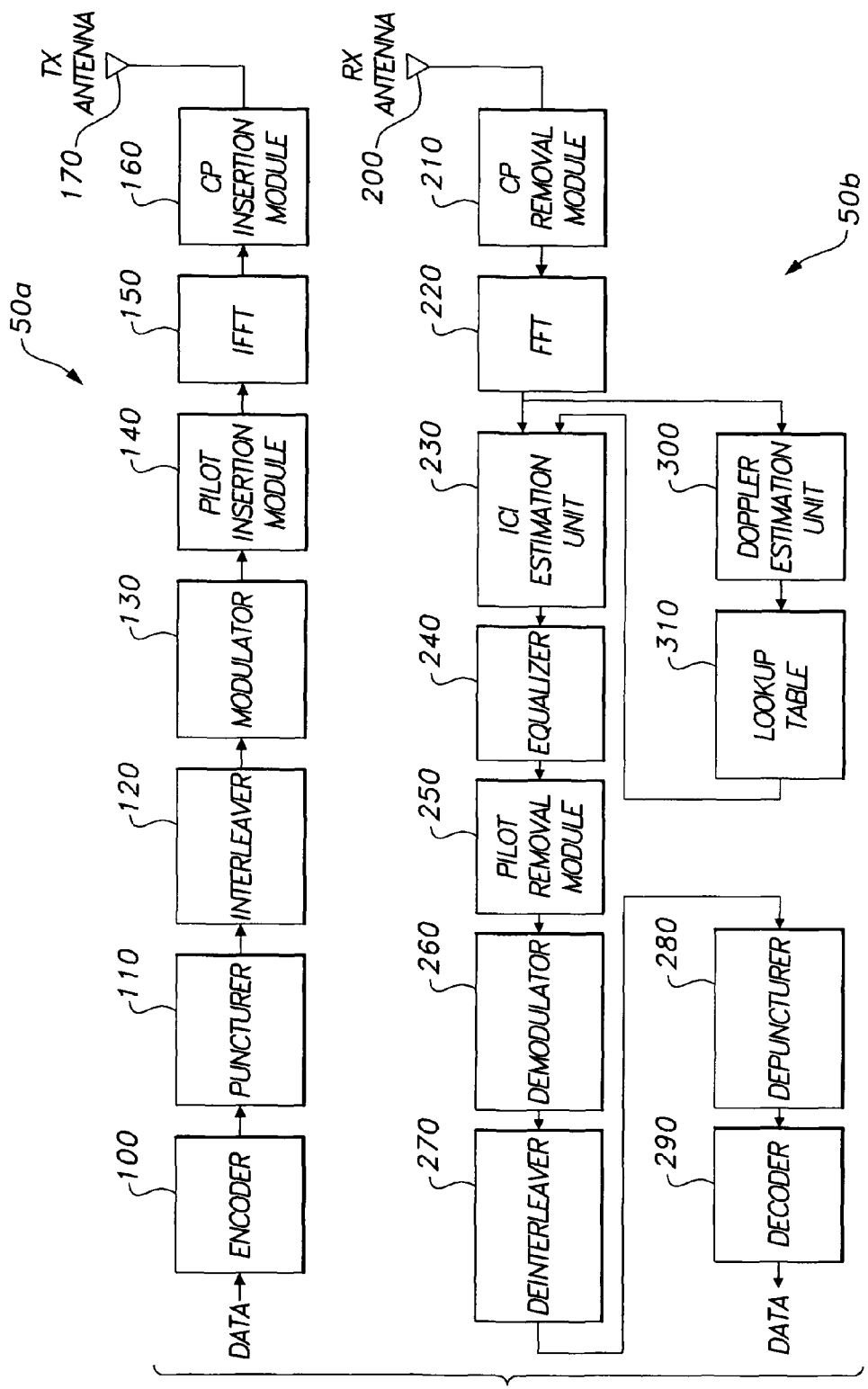
FIG. 1 is the functional block diagram of an exemplary OFDM system for carrying out an OFDM inter-carrier interference cancellation method according to the present invention.

The method presented implements a novel algorithm that reduces or mitigates the effects of ICI on signals transmitted in an OFDM system, the frequency domain channel matrix G is estimated in terms of a parameter vector using an Eigenvalue Decomposition (EVD) based approach. FIG. 1 shows the block diagram of a transmitter portion 50a and a receiver portion 50b of an OFDM system with N carriers. Referring to FIG. 1, at the transmitter the data is first encoded 100, punctured 110 and then interleaved 120. The resulting bit sequence is then modulated by the modulator 130 and passed to the pilot insertion module 140, which inserts the pilot symbols, and then passed through the IFFT module 150. The cyclic prefix (CP) insertion module 160 then appends a CP and the signal is then transmitted via the transmission antenna 170.

At the receiver 50b, the transmitted symbol is received by the receiving antenna 200 and passed to the CP removal module 210, the FFT module 220 and passes it to the ICI estimation unit 230. The received signal is also fed to the Doppler frequency estimation unit 300, which sends the estimate of the Doppler frequency to a lookup table 310. There are several methods available for the estimation of Doppler frequency any of which maybe employed here. The lookup table then sends the relevant information to the ICI estimation unit 230, which then passes on the signal to the equalizer 240 to remove the ICI. After mitigating the effect of ICI on the received signal, it is passed to the pilot removal module 250, demodulator 260, de-interleaver 270, de-puncturer 280 and decoder 290 so as to obtain the original data.

The encoder 100, puncture 110, interleaver 120 and modulator 130 modules herein refer to any general encoder, puncture, interleaver, modulator and any available implementation can be used for these modules along with their corresponding decoder 290, de-puncturer 280, de-interleaver 270 and demodulator 260.

Figure 2:
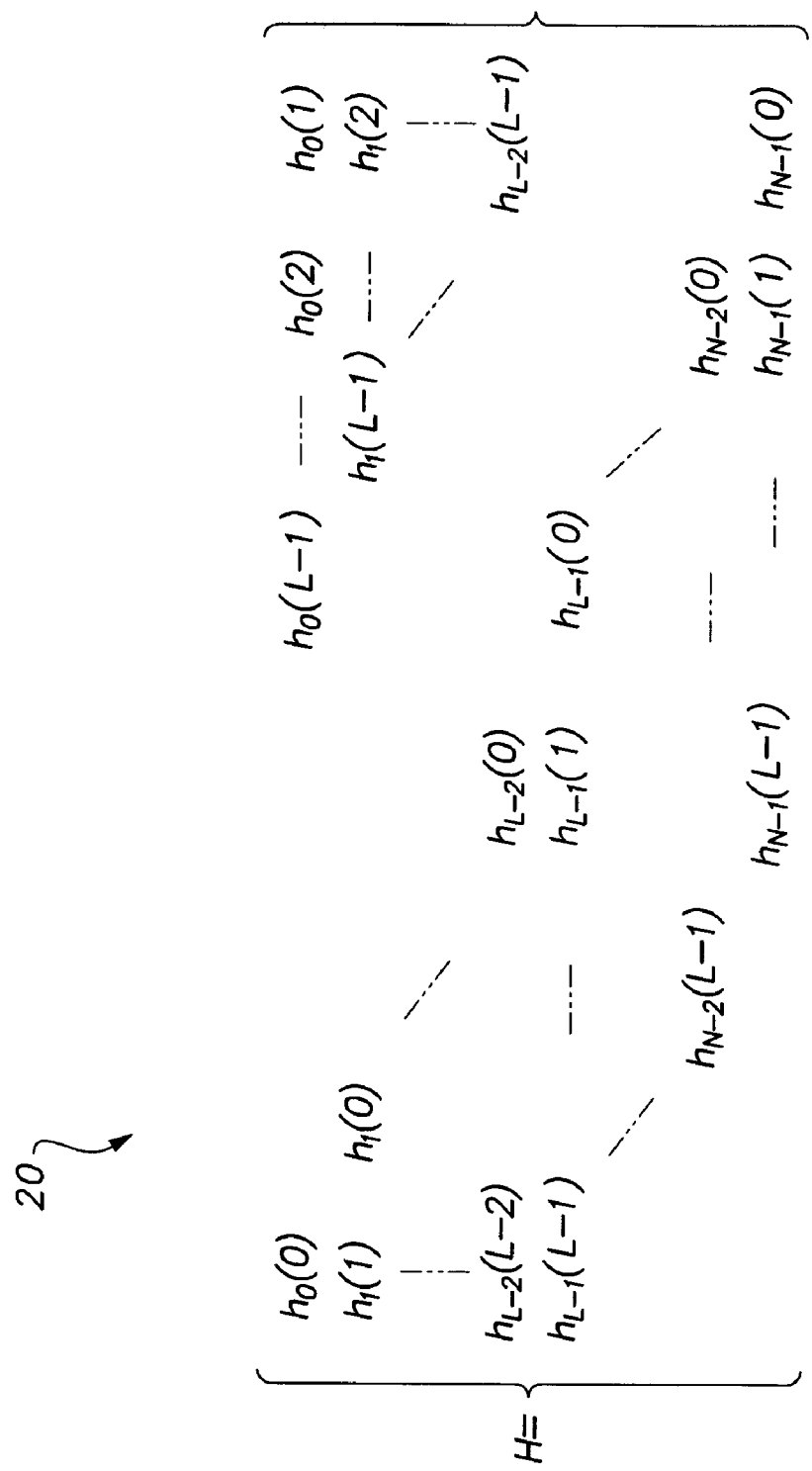
FIG. 2 is a diagram showing the structure of the time domain channel matrix for an OFDM system.

The CP added to the OFDM symbol by CP insertion module 160 is assumed to be of length equal to or larger than the Channel Impulse Response (CIR) memory length denoted by L. The CP serves to absorb the ISI introduced by the channel. At the receiver 50b, the CP is stripped and the ISI free time domain signal is obtained, mathematically defined by the relation, $$y = Hx + v \quad (1)$$

where y is the received symbol, H is channel matrix given in FIG. 2, x is the transmitted symbol and v is the additive white Gaussian noise. In the frequency domain, the relationship can be depicted as $$y = GX + v \quad (2)$$

where $y = [y(0), \ldots y(N-1)]^T$ and $x = [x(0), \ldots x(N-1)]^T$ are the receive and transmit signals, $G \triangleq QHQ^H$ is the channel matrix ($Q^H$ is the N—point Inverse Fast Fourier Transform (IFFT) matrix) and v is the noise vector, all in the frequency domain. If the channel remains constant for the duration of an OFDM symbol (a block fading channel model), $h_n(I)$ is independent of time n making H circulant and hence G becomes a diagonal matrix, i.e. no ICI occurs. Thus in absence of ICI the various subcarriers of the OFDM symbol are decoupled and hence one tap FEQ is optimal.

For time variant channels, as in the case of mobile users, H is no longer circulant and thus G is no longer a diagonal matrix and some of the signal energy is leaked to the neighboring subcarriers. The input/output relationship of the $k^{th}$ subcarrier is given as $$y(k) = G_{k,k} x(k) + \sum_{n=0, n \neq k}^{N-1} G_{k,n} x(n) + v(k) \quad (3)$$

The first term on the right side is the desired signal while the second term is the ICI. In a fast varying channel (high Doppler environment), this ICI term becomes significant and produces an irreducible error floor. An extreme worst case of ICI will result in non-zero values for all $N^2$ elements of G. A moderate case of ICI will result in G having M diagonals, i.e. G is banded. For a banded G, all the elements not contributing to the diagonals can be set to zero.

Let $R_G$ denote the autocorrelation matrix of vec(G), where vec(G) refers to the mathematical operation of vectorization of matrix G into a column matrix, and $R_H$ denote the autocorrelation matrix of vec(H). The relation between them is $$R_G = (Q^* \otimes Q) R_H (Q^* \otimes Q)^H \quad (4)$$

The time domain channel matrix H, shown as item 20 in FIG. 2, can be expressed as a sum of L matrices $$H = \sum_{l=0}^{L-1} A_l \quad (5)$$

where $$A_l = \mathrm{diag}(h_0(l), h_1(l), h_2(l), \ldots, h_{N-1}(l)) B^l$$

and B is the N×N permutation matrix given as $$B = \begin{bmatrix} 0 & 0 & \cdots & 0 & 1 \\ 1 & 0 & \cdots & 0 & 0 \\ 0 & 1 & \cdots & 0 & 0 \\ \vdots & \vdots & \ddots & \vdots & \vdots \\ 0 & 0 & \cdots & 1 & 0 \end{bmatrix} \quad (6)$$

With $B^l$ having l left columns cyclically shifted to the right then $R_H$ can be represented as $$R_H = \sum_{l=0}^{L-1} C_l \quad (7)$$

where $C_l$ is the autocorrelation matrix of vec($A_l$). From Jake's model of time variation, we have $$E[h_m(l) h_n(l)^*] = J_0(2\pi f_d(m-n)T) \triangleq J(m-n) \quad (8)$$

where $J_0(.)$ is the Bessel function of zeroth-order, $f_d$ is the Doppler frequency and T is the sampling time period. Based on equation (8), we can represent the elements of matrix $C_0$ as $$C_0 = E[\mathrm{vec}(A_0) \mathrm{vec}(A_0)^H] \quad (9)$$

$$= \begin{bmatrix} J(0) & 0_{1,N} & J(1) & 0_{1,N} & \cdots & 0_{1,N} & J(N-1) \\ J(1) & 0_{1,N} & J(0) & 0_{1,N} & \cdots & 0_{1,N} & J(N-2) \\ \vdots & \vdots & \vdots & \vdots & \ddots & \vdots & \vdots \\ J(N-1) & 0_{1,N} & J(N-2) & 0_{1,N} & \cdots & 0_{1,N} & J(0) \end{bmatrix}$$

The rest of the $C_l$'s can be obtained in a similar fashion. It is evident from equation (7) that the rank of $C_l$ is N and that the matrices $C_l$ are never non-zero at the same position (if $C_l(m,n) \neq 0$ then $C_{l'}(m,n) = 0$ for $l \neq l'$). The rank of $R_H$ then comes out to be NL. Also, it is evident that the elements of $C_l$ belong to the matrix J defined as $$J = \begin{bmatrix} J(0) & J(1) & \cdots & J(N-1) \\ J(1) & J(0) & \cdots & J(N-2) \\ \vdots & \vdots & \ddots & \vdots \\ J(N-1) & J(N-2) & \cdots & J(0) \end{bmatrix} \quad (10)$$

The advantage of this decomposition of matrix H is that we can easily obtain the EVD of $R_H$, and hence that of $R_G$, from J, thus this decomposition method is preferable in the present invention.

Figure 3:
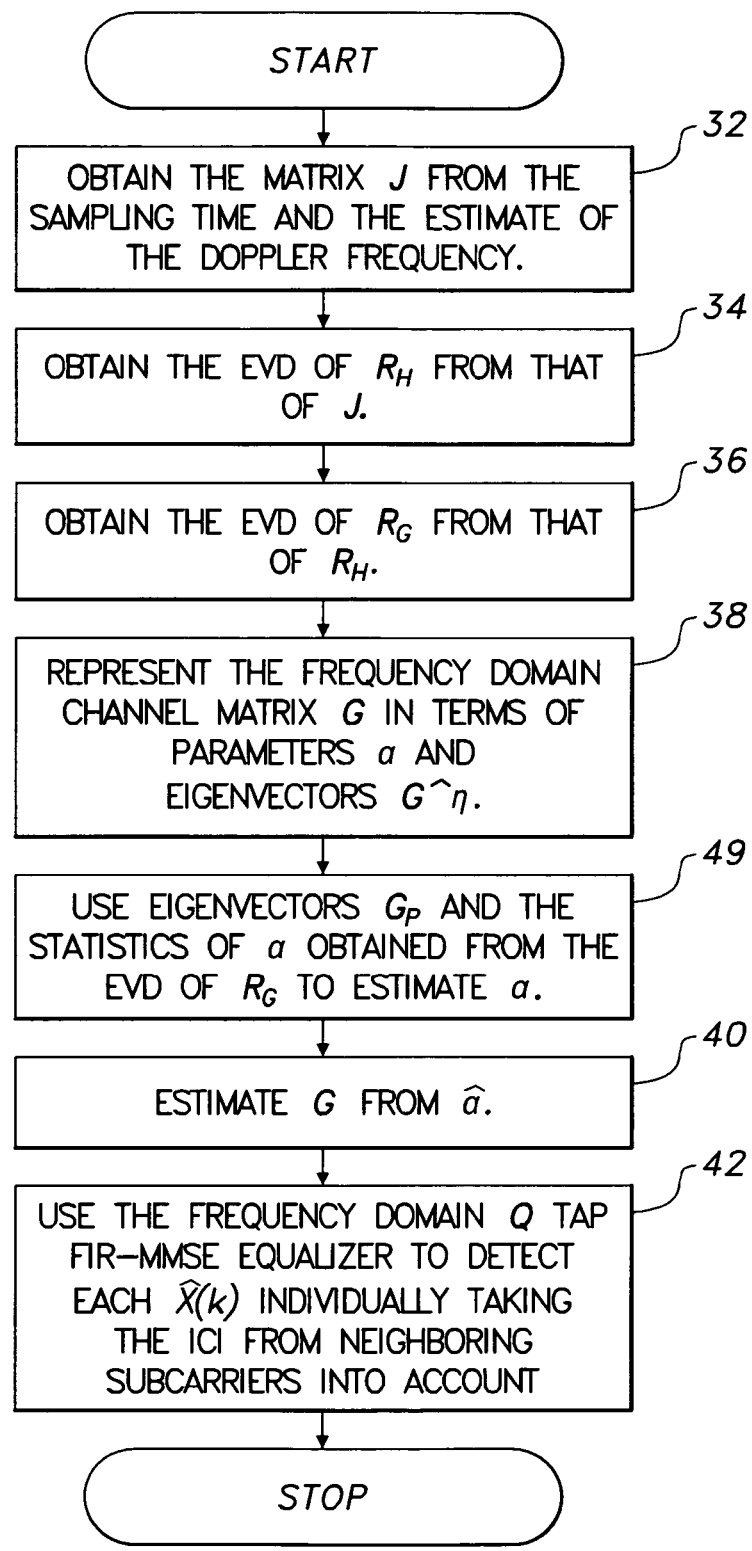
FIG. 3 is a flowchart of operations performed in estimating each individual subcarrier taking into account the ICI from the neighboring subcarriers in an OFDM inter-carrier interference cancellation method according to the present invention.

FIG. 3 shows the flowchart of the algorithm comprised of sampling time and Doppler frequency estimating step 32, EVD calculation steps 34 and 36, frequency domain channel matrix building step 38, alpha estimation step 49, G estimation step 40 and equalization step 42.

Let $\lambda_n$ be the eigenvalues and $v_n$ be the eigenvectors obtained by the EVD of $R_G$, the autocorrelation matrix of vec(G). The EVD of $R_G$ can be obtained from the EVD of $R_H$ the autocorrelation matrix of vec(H). The matrix H can be expressed as a sum of L matrices ($A_0, \ldots, A_{L-1}$) and the EVD of $R_H$ can in turn be obtained from the EVD of the autocorrelation matrices of vec($A_l$), namely $C_l$, which can in turn be obtained from the EVD of the matrix J. The method holds for channels with any arbitrary Power Delay Profile (PDP), in which case the eigenvalues of $R_H$ will be scaled by the individual power of each tap.

The matrix J is a positive definite Toeplitz Hermitian matrix, and for large N can be assumed approximately circulant. From the properties of circulant matrices, $$J = Q \Lambda Q^H \quad (11)$$

where $\Lambda$ is a diagonal matrix whose $m^{th}$ diagonal element $\lambda(m,m)$ is given by $$\lambda(m,m) \triangleq \sum_{k=o}^{N-1} J_0(2\pi k f_d T_S) e^{-\frac{j2\pi km}{N}} \quad (12)$$

Thus the EVD of J, and hence that of $R_G$ has very low computational complexity. Using the EVD of $R_G$, the input/output equation of the OFDM system can be written in terms of the $N_d L$ dominant parameters $\alpha_p$ as $$y = GX + V \approx \sum_{p=1}^{N_d L} \alpha_p G_p x + v \quad (13)$$

$$= \sum_{p=1}^{N_d L} \alpha_p \varepsilon_p + v \quad (14)$$

where $\alpha_p$'s are independent Gaussian random variables that need to be estimated each with mean zero and variance equal to the eigenvalue $\lambda_p$, $G_p = Q \mathrm{diag}(v_n) B^l Q^H$ and $\varepsilon_p \triangleq G_p x$. The advantage gained by this approach, is that the elements of the N×N matrix G can be estimated using only $N_d L$ parameters $\alpha_p$ with $N_d L << N^2$ and is an embodiment of the present invention. The $\lambda_p$'s and $G_p$'s can be pre-computed and stored in the lookup table 310 and selected on the basis of the estimate provided by the Doppler frequency estimation unit 300. For $$k \geq \frac{M}{2}$$

$$y(k) = \sum_{p=1}^{N_d L} \alpha_p \sum_{m=-M/2}^{M/2} G_p(k, k+m)x(k+m) + v(k) \quad (15)$$

$$= \sum_{p=1}^{N_d L} \alpha_p \varepsilon_p(k) + v(k) \quad (16)$$

where $$\varepsilon_p = \sum_{m=-M/2}^{M/2} G_p(k, k+m)x(k+m).$$

In order to determine $\alpha_p$ from the $k^{th}$ equation $\varepsilon_p(k)$ has to be known implying $\varepsilon_p(k)$ to be independent of data subcarriers, so the subcarriers $x(k-M/2), \ldots, x(k+M/2)$ must be pilots.

In terms of pilot overhead, it is more efficient to place pilots in large groups. For example, assuming G has M=3 main diagonals, placing pilots in a consecutive group {1, 2, 3, 4, 5, 6} produces four ICI free equations y(2), y(3), y(4), y(5) while splitting the pilots in two groups {1, 2, 3} and {11, 12, 13} produces only two ICI free equations namely y(2) and y(12). Let $\{k_{t1}, k_{t2}, \ldots, k_{tT}\}$ be the set of ICI free output carriers that can be used from training. Pruning equation (16) of all carriers that do not belong to the training set, we are left with T equations in $N_d L$ unknowns $$\underline{y} = \sum_{p=1}^{N_d L} \alpha_p \underline{\varepsilon_p} + \underline{v} \quad (17)$$

where the underline denotes the matrices are pruned. In matrix form, it is written as $$\underline{y} = \underline{E}\alpha + \underline{v} \quad (18)$$

$$\underline{y} = \begin{bmatrix} y(k_{t1}) \\ y(k_{t2}) \\ \vdots \\ y(k_{tT}) \end{bmatrix} \quad (19)$$

$$\underline{E} = [\underline{\varepsilon_1} \ \ldots \ \underline{\varepsilon_{N_d L}}]$$

$$\underline{\varepsilon_p} = \begin{bmatrix} \varepsilon_p(k_{t1}) \\ \varepsilon_p(k_{t2}) \\ \vdots \\ \varepsilon_p(k_{tT}) \end{bmatrix} \quad (20)$$

$$\alpha = [\alpha_1 \ \ldots \ \alpha_{N_d L}]$$

Thus the problem reduces to a Bayesian estimation problem. The covariance matrix of $\alpha$ is given as $R_\alpha = \text{diag}([\lambda_1, \ldots, \lambda_{N_d}])$. The estimate $\hat{\alpha}$ can be estimated using an LMMSE estimator $$\hat{\alpha} = R_\alpha \underline{E}^H [R_v + \underline{E} R_\alpha \underline{E}^H]^{-1} \underline{y} \quad (21)$$

$$\hat{\alpha} = [R_\alpha^{-1} + \underline{E}^H R_v^{-1} \underline{E}]^{-1} \underline{E}^H R_v^{-1} \underline{y} \quad (22)$$

For the case of white noise, the form of equation (22) reduces the matrix inversion from T to $N_d L$ with $T \geq N_d L$. The performance of the estimator is measured in terms of the error $\epsilon = \alpha - \hat{\alpha}$ with mean zero and covariance $$C_\epsilon = [R_\alpha^{-1} + \underline{E}^H R_v^{-1} \underline{E}]^{-1}. \quad (23)$$

Specifically the estimation algorithm detailed here include the following steps: (1) determine the $N_d$ dominant eigenvalues and eigenvectors off offline; (2) determine the $N_d L$ dominant eigenvalues and eigen vectors of $R_H$ offline from those of J; (3) determine the $N_d L$ dominant eigenvalues and eigen vectors of $R_G$ offline from those of $R_H$; and (4) compute $\hat{\alpha}$ using (22) and approximate G using $\alpha$'s and eigenvectors as in (13).

TABLE 1

| Operation | | Complexity | Remark |
|---|---|---|---|
| Step 4 | $S_1$: Forming E | $TN_d LM$ complex multiplications $TN_d L(M-1)$ complex additions | Can be computed offline |
| | $S_2$: Inverse of $R_\alpha$ | $N_d L$ read divisions | for known N, $f_d$ and SNR |
| | $S_3$: Calculate $S_1^H R_v^{-1} S_1$ | $\frac{1}{2}T(N_d L)^2$ complex multiplications $\frac{1}{2}(T-1)(N_d L)^2$ complex additions | |
| | $S_4$: Inverse of $(S_1 + S_2)$ | $(N_d L)^2$ real divisions $N_d L(N_d L - 1)(N_d L + 1)$ complex divisions $N_d L(N_d L - 1)(N_d L + 1)$ complex multiplications $N_d L(N_d L - 1)(N_d L + 1)$ complex subtractions | |
| | $S_5$: Calculate $S_1^H R_v^{-1} S_4$ | $T(N_d L)^2$ complex multiplications $TN_d L(N_d L - 1)$ complex additions $N_d L$ real divisions | |
| | $S_6$: Calculate $S_5 y$ | $T(N_d L)$ complex multiplications $(T-1)(N_d L)$ complex additions | Real time |
| Step 5 | Approximate G | $N_d LMN$ complex multiplications $MN(N_d L - 1)$ complex additions | Real time |

Steps 1-3 of the algorithm can be calculated offline and need to be calculated only once. For a given N and $f_d$, these matrices can be pre-computed and stored in lookup tables. Hence, the complexity comparison is done for step 4 and 5 only. Step 4 consists of 6 operations. For known N, $f_d$ and signal-to-noise ratio (SNR), the first five of these can be computed offline to reduce processing complexity and delay. The computational complexity of each operation required to perform steps 4 and 5 of the OFDM Inter-Carrier Interference (ICI) cancellation method is listed in Table 1.

Figure 4:
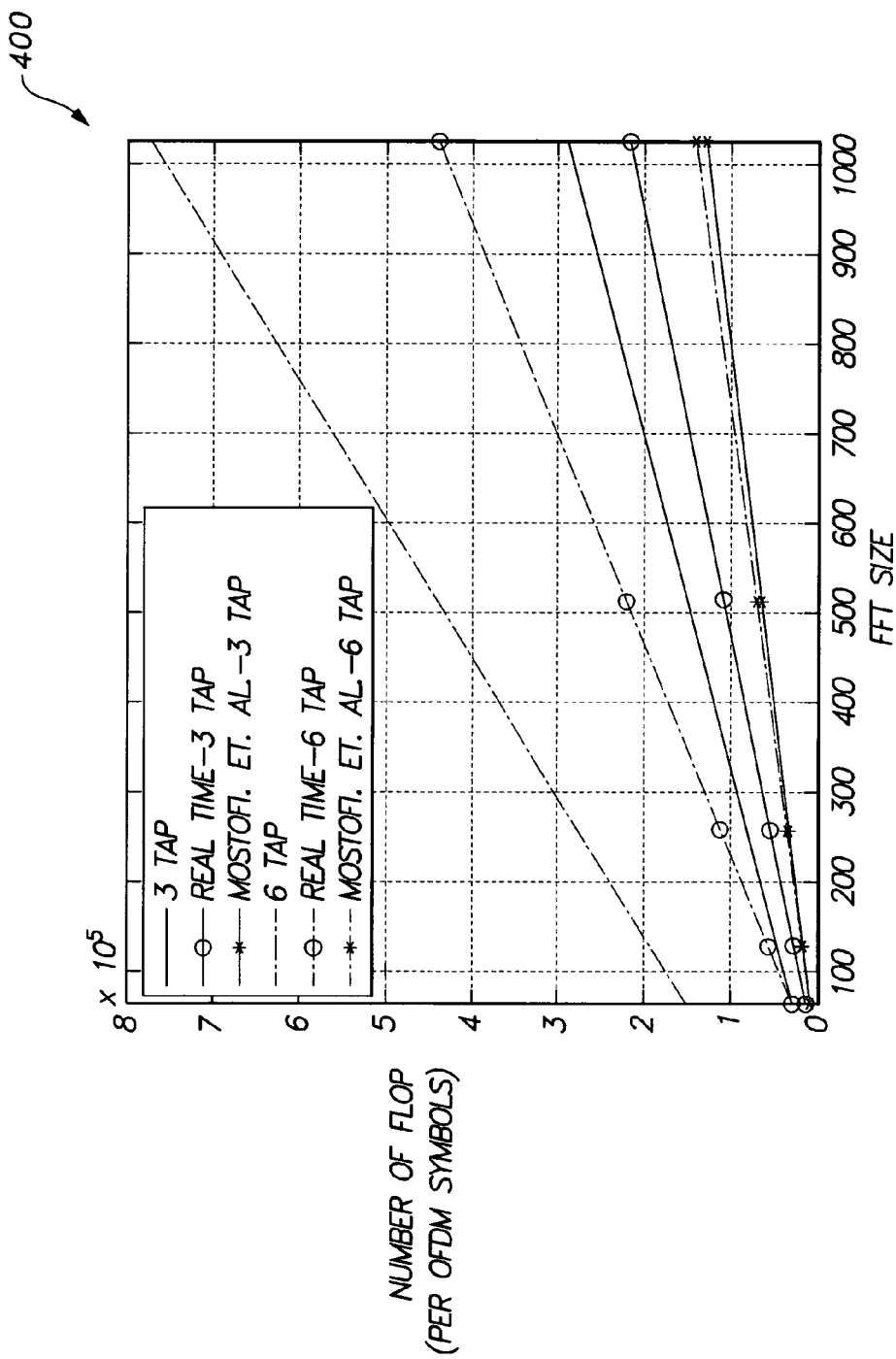
FIG. 4 is a chart showing computation complexity in an OFDM inter-carrier interference cancellation method according to the present invention compared to a method of the prior art.

FIG. 4 shows the comparison 400 of computational complexities of the OFDM inter-carrier interference cancellation method and an algorithm proposed by Mostofi et al. in "ICI Mitigation for Pilot-Aided OFDM Mobile Systems," *IEEE Transactions on Wireless Communications*, Vol. 4, No. 2 (March 2005), hereinafter referred to as Mostofi et. al.'s (2005) algorithm. The comparison is performed for only the channel estimation step as once the channel estimate is obtained, the same decoding algorithm can be used in both cases for decoding information. From the perspective of complexity, the algorithm presented herein is better suited for smaller FFT sizes with relatively small number of channel taps. For example, the T1 TMS320C6455-1000 DSP, which has a processing capability of 8000 MIPS, takes 6.78 µs for the proposed algorithm while it takes 4.06 µs for Mostofi et. al. algorithm. However, the Mostafi et. al. algorithm suffers from higher latency and requires larger buffer to process adjacent OFDM symbols together. The exemplary embodiment of the present invention avoids both of these issues.

The equalization step is achieved by a Q-tap (Q<<N) MMSE based FIR filter 240 and is an embodiment of the present invention. The equalizer 240 detects each subcarrier individually, taking into account the ICI from neighboring subcarriers.

$$\hat{X}_m = w_m y_m \quad (24)$$

where $w_m$ is equalization filter taps given by $$w_m = g_m^H (G_m G_m^H + \sigma^2 I_Q)^{-1} \quad (25)$$

where $g_m$ is the middle column of $G_m$.

The simulations are carried out for an OFDM system with FFT size of N=256 and N=1024. A half rate convolutional encoder with bit interleaving is implemented. A Doppler frequency of 10% is applied normalized to the subcarrier spacing. The channel is assumed to be 3-tap (L=3) with an exponential power delay profile. Each channel tap is generated by an independent complex Gaussian random variable with time correlation based on Jakes model.

Figure 5:
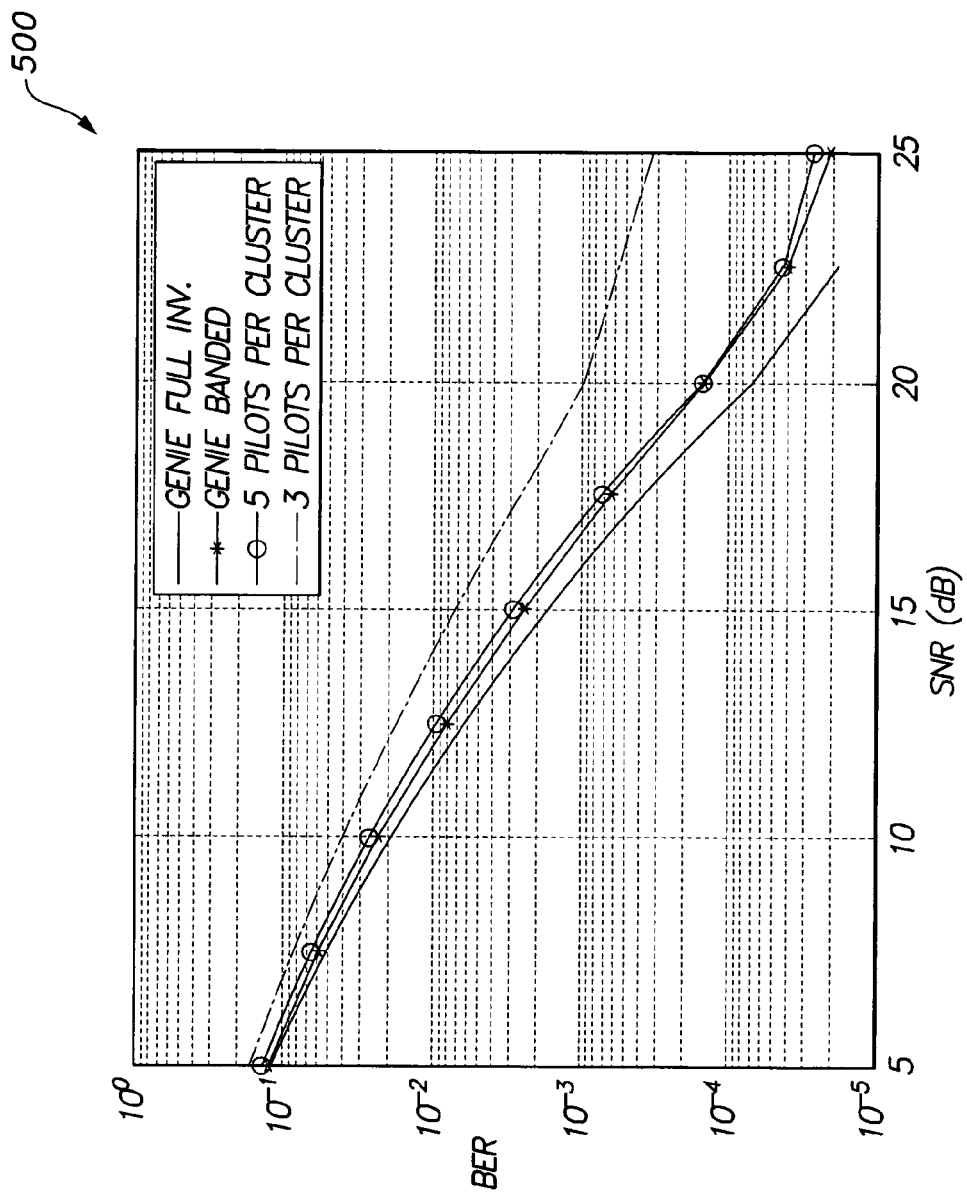
FIG. 5 is a chart showing a comparison between full Genie channel, banded Genie channel, 3 pilot tones per cluster and 5 pilot tones per cluster for an OFDM system with 256 subcarriers in an OFDM inter-carrier interference cancellation method according to the present invention.
Figure 6:
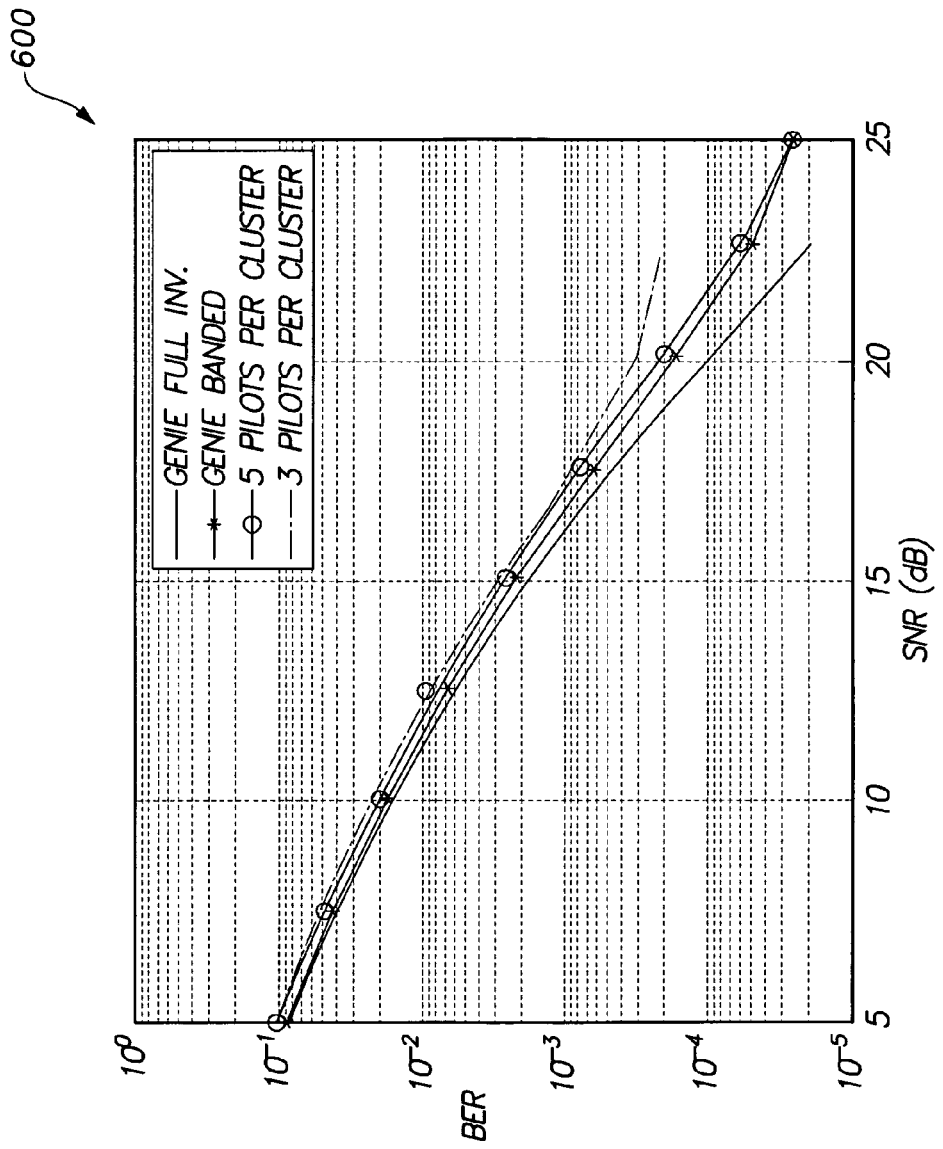
FIG. 6 is a chart showing a comparison between full Genie channel, banded Genie channel, 3 pilot tones per cluster and 5 pilot tones per cluster for an OFDM system with 1024 subcarriers in an OFDM inter-carrier interference cancellation method according to the present invention.

A larger normalized Doppler results in a larger number of dominant eigenvalues of J. For a Doppler of 10% with the aforementioned FFT sizes, it was found that the first 3 eigenvalues of f are dominant ($N_d$=3) and the rest of the eigenvalues are approximately zero. Of the available N subcarriers, 15% are used as pilots. The pilots are placed in equispaced clusters of 3 or 5 pilots each. The results are compared with two cases of the perfect channel, also known as the 'Genie' channel; when the matrix G is a full matrix and when G is banded. Graph 500 of FIG. 5 and graph 600 of FIG. 6 show that performance of 5 pilot tones per cluster is very close to a banded Genie channel for all SNR's (less than 0.5 dB gap) for both Fast Fourier Transform (FFT) sizes in low to mid SNR range while the 3 pilot per cluster suffers a 2-3 dB loss for N=256 and around 1-1.5 dB loss for N=1024 system in low to mid SNR range.

Figure 7:
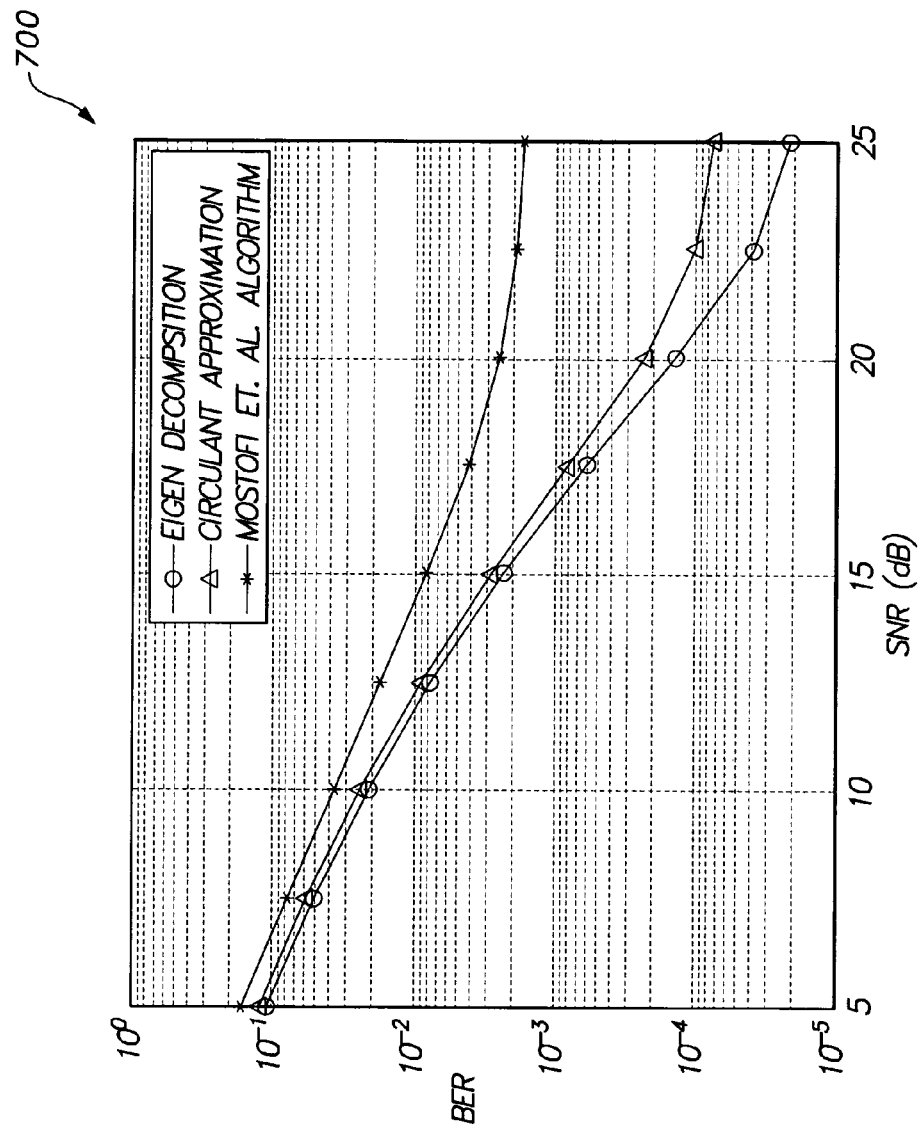
FIG. 7 is a chart showing a comparison of the simulated Bit Error Rates (BER's) vs. signal-to-noise ratio (SNR) for eigenvalue decomposition and circular approximation in an OFDM inter-carrier interference cancellation method according to the present invention to a prior art method for 256 subcarriers.
Figure 8:
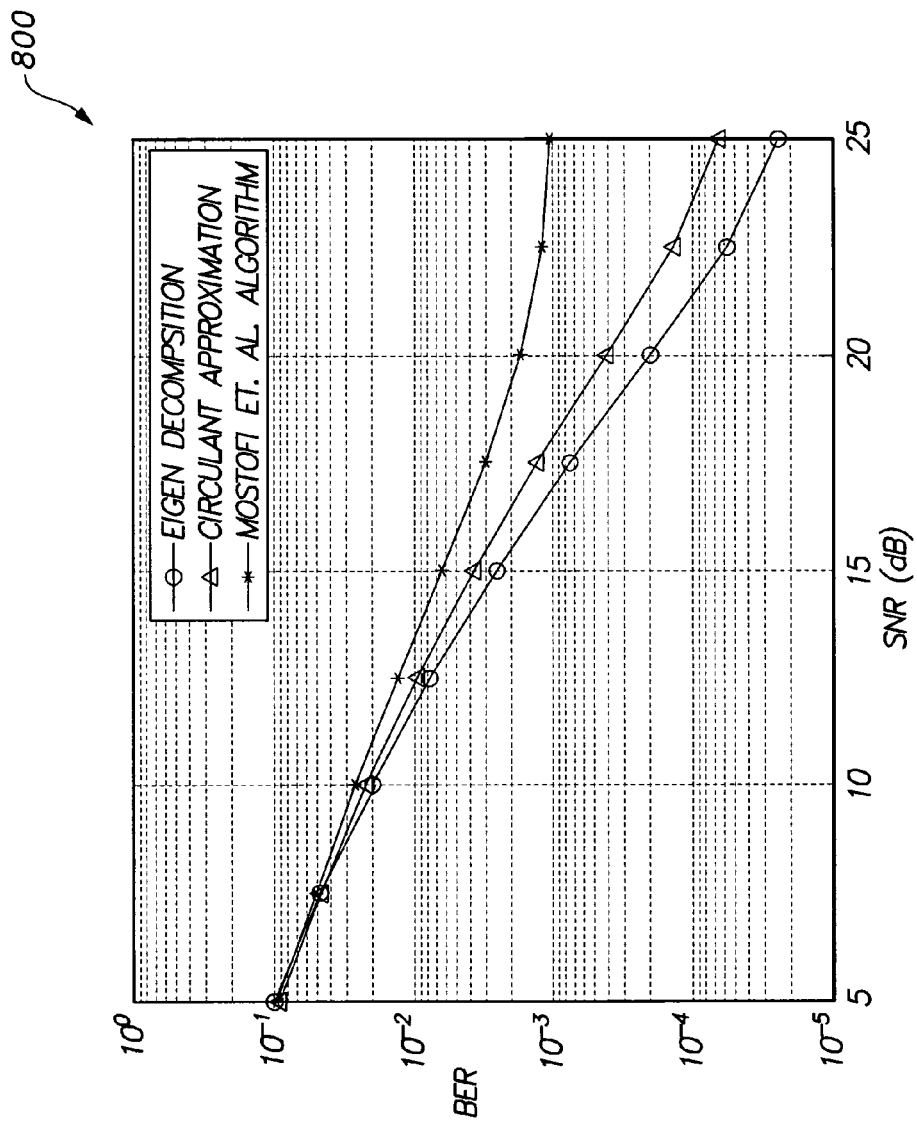
FIG. 8 is a chart showing a comparison of the simulated Bit Error Rates (BER's) vs. signal-to-noise ratio (SNR) for eigenvalue decomposition and circular approximation in an OFDM inter-carrier interference cancellation method according to the present invention to a prior art method for 1024 subcarriers.

Graph 700 of FIG. 7 compares the performance of the present invention with eigenvalue decomposition, its circular approximation and Mostofi et. al. algorithm using 5 pilot tones per cluster for N=256. Graph 800 of FIG. 8 compares the same for N=1024. As evident from the graphs, the BER of circulant approximation is within 0.5-1 dB of eigen decomposition for low-to-mid SNR levels for both systems. The BER of N=256 system approaches an error floor at high SNRs but that can be mitigated by using larger FFT size. As shown, the Mostofi et. al. algorithm degrades considerably from mid SNR levels and approaches an error floor.

Advantageously, the present invention allows high-speed data transmission over rapidly changing mobile channels for mitigating the ICI. Moreover, the present invention has a better BER performance for the same number of pilots as compared to previous approaches. Additionally, the present invention makes use of a priori information i.e. frequency and time correlation, and is able to deal with higher Doppler shift than previously available methods, and at a lower computational complexity.

Although the description and discussion were in reference to certain exemplary embodiments of the present invention, numerous additions, modifications and variations will be readily apparent to those skilled in the art. The scope of the invention is given by the following claims, rather then the preceding description, and all additions, modifications, variations and equivalents that fall within the range of the stated claims are intended to be embraced therein.

The method may be implement in modulation or multiplexer circuits in a discrete transmitter, a discrete receiver, or a transceiver. The circuits may utilize a microprocessor, digital signal processor, application specific integrated circuit (ASIC), or other components programmed or configured to implement the steps of the method according to conventional construction techniques.

It is to be understood that the present invention is not limited to the embodiment described above, but encompasses any and all embodiments within the scope of the following claims.

We claim:

1. An OFDM inter-carrier interference cancellation method operable within a receiver of an OFDM communication system, the method comprising the steps of:
   receiving a signal, the signal comprising a cyclic prefix, pilot subcarriers, and modulated subcarriers representing an OFDM symbol, the OFDM symbol containing a stream of transmitted data bits;
   removing the cyclic prefix from the received signal;
   applying the received signal to a Fast Fourier Transform (FFT) in order to recover the modulated values of all of the subcarriers;
   providing a channel estimation based on the pilot subcarriers;
   providing an estimate of Doppler frequency and sampling time period;
   computing an Eigenvalue Decomposition (EVD) based on the estimate of the Doppler frequency and the sampling time period;
   equalizing the channel based on said channel estimation and the EVD computation, the channel equalization removing any detected inter-carrier interference (ICI), leaving the OFDM symbol free of ICI;
   demodulating the ICI-free OFDM symbol;
   removing the pilot subcarriers; and
   decoding the resulting signal to obtain the transmitted data bits.

2. The OFDM inter-carrier interference cancellation method according to claim 1, wherein said channel estimating step is based on inherent constraints of the communication system.

3. The OFDM inter-carrier interference cancellation method according to claim 1, wherein said channel estimating step further comprises the step of using pilot subcarriers placed in M groups of k consecutive pilot subcarriers each.

4. The OFDM inter-carrier interference cancellation method according to claim 1, further comprising the step of performing the channel estimation and ICI cancellation steps in the frequency domain.

5. The OFDM inter-carrier interference cancellation method according to claim 1, further comprising the step of utilizing a channel tap time evolution model.

6. The OFDM inter-carrier interference cancellation method according to claim 1, further comprising the step of approximating a positive definite Toeplitz Hermitian matrix J as a circulant matrix for large N, thereby reducing computational complexity of the method.

7. The OFDM inter-carrier interference cancellation method according to claim 6, further comprising the step of calculating an autocorrelation of vec(H) from the matrix J.

8. The OFDM inter-carrier interference cancellation method according to claim 7, further comprising the step of calculating an autocorrelation of vec(G) from that of vec(H).

9. The OFDM inter-carrier interference cancellation method according to claim 1, wherein the channel estimation step further comprises using only significant eigenvalues, thereby notably reducing a number of parameters to be estimated.

10. The OFDM inter-carrier interference cancellation method according to claim 7, further comprising the step of approximating the channel according to the relation, $$G \approx \sum_{p=1}^{N_{dL}} \alpha_p G_p$$

where G is frequency domain channel, $N_dL$ is the number of dominant eigenvalues, $G_p$ are the eigenvectors and $\alpha_p$ are the estimation parameters having an autocorrelation matrix $R_a = \text{diag}(\lambda_1, \lambda_2, \ldots, \lambda_{Nd})$, $\lambda$'s being the eigenvalues.

11. The OFDM inter-carrier interference cancellation method according to claim 10, wherein a linear minimum mean square error (LMMSE) estimator is used to estimate the parameters $\alpha_p$.

12. The OFDM inter-carrier interference cancellation method according to claim 1, wherein an equalizer performing the equalization step at least partially mitigates the effect of ICI.

13. The OFDM inter-carrier interference cancellation method according to claim 12, wherein said equalizer detects each subcarrier individually, taking the ICI from neighboring subcarriers into account.

14. The OFDM inter-carrier interference cancellation method according to claim 1, further comprising the step of providing equalization taps based on the estimate of the channel and hence of the ICI component.

15. The OFDM inter-carrier interference cancellation method according to claim 1, wherein the ICI removing step further comprises the step of utilizing a frequency domain reduced tap Finite Impulse Response (FIR) filter equalization method.

16. The OFDM inter-carrier interference cancellation method according to claim 1, wherein the equalization method is based on MMSE criterion.

17. The OFDM inter-carrier interference cancellation method according to claim 1, further comprising the step of utilizing, within said OFDM communication system, a plurality of antennas having Multi Input Multi Output (MIMO) settings.

18. The OFDM inter-carrier interference cancellation method according to claim 1, further comprising an Eigenvalue Decomposition (EVD) based channel estimation approach wherein the EVD is computed based on the estimate of Doppler frequency and sampling time period.

19. A wireless communications receiver having a modulation circuit configured for carrying out the method according to claim 1.

20. A wireless communications transceiver having a modulation circuit configured for carrying out the method according to claim 1.

* * * * *